United States Patent
Momoi

(10) Patent No.: US 7,211,303 B2
(45) Date of Patent: May 1, 2007

(54) ALIGNMENT FILM AND LCD MADE OF THE SAME

(75) Inventor: Yuichi Momoi, Shiga-ken (JP)

(73) Assignee: Chi Mei Optoelectronics Inc., Tainan County (TW)

( * ) Notice: Subject to any disclaimer, the term of this patent is extended or adjusted under 35 U.S.C. 154(b) by 186 days.

(21) Appl. No.: 11/020,685

(22) Filed: Dec. 22, 2004

(65) Prior Publication Data

US 2006/0134348 A1  Jun. 22, 2006

(30) Foreign Application Priority Data

Dec. 24, 2003  (JP)  ............................. 2003-426997

(51) Int. Cl.
C09K 19/00 (2006.01)
G02F 1/1337 (2006.01)
C08L 63/00 (2006.01)
C08L 79/04 (2006.01)

(52) U.S. Cl. .................. 428/1.1; 428/1.2; 428/1.25; 428/1.26; 428/1.53; 349/123; 525/928

(58) Field of Classification Search .............. 428/1.1, 428/1.2, 1.25, 1.26, 1.53; 349/123; 525/928
See application file for complete search history.

(56) References Cited

U.S. PATENT DOCUMENTS

| | | | | |
|---|---|---|---|---|
| 5,866,034 A | * | 2/1999 | Han | 252/299.4 |
| 6,106,906 A | * | 8/2000 | Matsuda et al. | 427/558 |
| 2004/0066480 A1 | * | 4/2004 | Yoshida et al. | 349/123 |
| 2006/0024452 A1 | * | 2/2006 | Kondo et al. | 428/1.26 |

FOREIGN PATENT DOCUMENTS

JP  10081821  *  3/1998

* cited by examiner

Primary Examiner—Shean C Wu
(74) Attorney, Agent, or Firm—Thomas, Kayden, Horstemeyer & Risley

(57) ABSTRACT

An alignment film for avoiding the degradation of the charge holding rate of a LCD, due to ionic impurity of the liquid crystal materials, and the LCD that is made of the same is disclosed herein.

The alignment film 10 includes derivatives of polyimides or polyamides and low molecular thermosetting resins having a viscosity of 1–3000 Poise within the temperature of 25° C. Through the use of the alignment film 10 produced by the thermosetting resin monomers, the ionic impurity is prevented from contact with the pixel electrode 16. The performance of the LCD with the alignment film is improved during the test of reliability, even though a liquid crystal material with high dielectric anisotropy is used.

12 Claims, 4 Drawing Sheets

ALIGNMENT FILM AND LCD MADE OF THE SAME

FIELD OF THE INVENTION

The present disclosure relates to an alignment film for preventing the degradation of the charge holding rate of a liquid crystal material, and a liquid crystal display (LCD) made of the same.

BACKGROUND

In recent years, the technology for producing a LCD with large size or fine image has been improved. By selecting the liquid crystal materials with suitable dielectric anisotropy, a LCD with quick response time can be provided, and the image-retention problems can be eliminated at the same time.

In a LCD module, it is desirable to increase the charge holding rate. On the other hand, it is also desirable to increase the resistivity of the liquid crystal materials to restrict the local current flow through the liquid crystal materials. Therefore, to obtain high resistivity, it is desirable that the fineness of a liquid crystal material be substantially without any impurity. Some refining processes may be accomplished when producing the liquid crystal materials However, the resistivity of a liquid crystal material is not proportional to the charge holding rate, when it is higher than a predetermined level. The correlation between the resistivity and the charge holding rate may also depend on the dielectric properties derived from the resistivity, or the chemical compound structure of a liquid crystal material.

In general, the greater dielectric properties the liquid crystal material has, the more ionic impurities that may be released in the liquid crystal materials. Thus, the local current can flow through the liquid crystal materials easier. Accordingly, the existence of the ionic impurities in the liquid crystal materials can result in the decrease of the charge holding rate. It is desirable to provide an improved method for obtaining a finer liquid crystal material without ionic impurities.

The low-voltage liquid crystal materials generally contain ionic impurities, such as fluorine ion and/or cyanogen ion, dissolving in the liquid crystal materials to make the larger dielectric anisotropy and larger polarity. The liquid crystal materials with cyanogen ions may release more ionic impurity. In contrast, the liquid crystal materials with fluorine ions can prevent the charge holding rate from degradation as well, even if the dielectric anisotropy was increased. The liquid crystal materials with fluorine ions can prevent the charge holding rate of the liquid crystal materials from degradation, even the dielectric anisotropy of the liquid crystal materials is increased. Briefly, the impurity substituted by fluorine ions of liquid crystal materials can reduce its resolvability within the liquid crystal materials, so that the fluoro liquid crystal materials can be used for preventing the charge holding rate of the liquid crystal materials from degradation.

In order to improve the performance of the LCD, high-dielectric liquid crystal materials may be used. However, compared to other materials, when the liquid crystal materials with high dielectric properties are used, the high-electric liquid cyanogen crystal materials tend to release ionic impurity more easily than the other liquid crystal materials. Recently, liquid crystal materials with high dielectric anisotropy have been developed. In addition, some high dielectric constant liquid crystal materials have been developed, such as cyanogens crystal materials with two, three, or more fluoro-groups substituting for the cyanogen atoms. However, the impurity ion release rate of those fluoro liquid crystal materials with high dielectric anisotropy can be higher than the traditional liquid crystal materials with fluorine ion. Accordingly, it is desirable to provide some strategies for improving the reliability of the charge holding rate and for improving the mobility characteristic of the high-dielectric constant liquid crystal materials.

The first strategy involves improving the purity of the liquid crystal materials. However, the impurity of the liquid crystal materials can currently be rather high, and the possibility for further purifying the liquid crystal materials may be rather limited.

The second strategy is to eliminate the impurity released during the manufacturing processes and utilities. However, the manufacturing processes of the liquid crystal materials may be performed in a clean room that is cleaned regularly, so that the impurity released by the manufacturing environment is reduced.

The third strategy is to use liquid crystal materials with fewer ions. However, the choices of the liquid crystal materials are rather limited. In addition, the performance may be decreased. For example, the response time of the liquid crystal materials may be increased due to increasing the viscosity of liquid crystal materials, and/or, while the dielectric constant is decreased, increasing the drive voltage.

The forth strategy is to develop a sealing agent that allows the water and air flow through, instead of the impurity, such that the metal ion is prevented from passing through. Alternatively, a sealing agent may be developed that can release any impurity. However, for the moment, the development of the sealing agent has not been accomplished yet.

Japanese Patent Publication (Kokai) No. Heisei 10-81821 discloses a liquid crystal material, that can decrease the deviation of Pretilt Angle and the stretch of the alignment film due to the thermal treatment. Wherein the liquid crystal material is produced by mixing epoxy resin of the average molecular weight about 5,000 to 30,000 with the derivatives of polyimide and/or polyamic acid involved. The ratio of epoxy resin to polyimide and/or polyamic acid is ranged from 0.5:99.5 to 6:94. Although the Patent Publication (Kokai) No. Heisei 10-81821 can resolve the problems resulted from the thermo treatment, it does not resolve the degradation problems of the charge holding rate due to the release of ionic impurities.

SUMMARY

The present disclosure provides for an alignment film for preventing the degradation of the charge holding rate of a liquid crystal material, and production of a LCD that is made of the same.

The disclosure provides an alignment film comprising derivatives of polyimide and/or polyamic acid and low molecular thermosetting epoxy resins with a viscosity of about 1 to 3,000 Poise in 25° C.

The low molecular thermosetting epoxy resin and/or the derivatives of polyimide and/or polyamic acid are selected from the group consisting of the compounds that have hydroxyl group, carboxylic group, isocyanatic group, active ester, vinyl acrylic ester, acid anhydride, and epoxypropyl group. The low molecular thermosetting epoxy resin has an average molecular weight about from about 150 to 5,000, and comprises at least one aromatic component.

Furthermore, the mixing ratio of the low molecular thermosetting epoxy resins to the derivatives of polyimide and/or polyamic acid ranges from about 0.1:99.9 to 20:80, and the range from about 0.1:99.9 to 5:95 is more preferable.

One of the aspects of disclosure includes a LCD comprising a substrate and a filter, ether or both having the alignment films made of the same.

BRIEF DESCRIPTION OF THE DRAWINGS

The foregoing aspects and many of the attendant advantages of this disclosure will become more readily appreciated as the same becomes better understood by reference to the following detailed description, when taken in conjunction with the accompanying figures, wherein.

DETAILED DESCRIPTION

The present disclosure relates to an alignment film made of an epoxy resin compound that comprises thermosetting epoxy resins with aromatic components and derivatives of polyimide and/or polyamic acid. The thermosetting epoxy resins have a low average molecular weight and a viscosity of about 1 to 3,000 in 25° C. The alignment film can prevent the degradation of the of the charge holding rate of a liquid crystal material, due to the ionic impurity of the liquid crystal material flowing through the alignment film.

As the use of the alignment films in a LCD, a reliability test is conducted, according to one disclosed embodiment. The result of the reliability test determines that the charge holding rate of the LCD can be retained greater than about 95% for 2,000 hours within a high humidity environment, wherein the high humidity environment is an environment of 80% relative humidity in 70° C. The attendant advantages of the alignment films can be retained, even if the liquid crystal materials of high dielectric anisotropy are used in LCD modules.

The disclosure relates to an alignment film that can prevent the degradation of charge holding rate of a LCD, resulting from ionic impurity of the liquid crystal materials, and the LCD made of the same.

Figure 1:
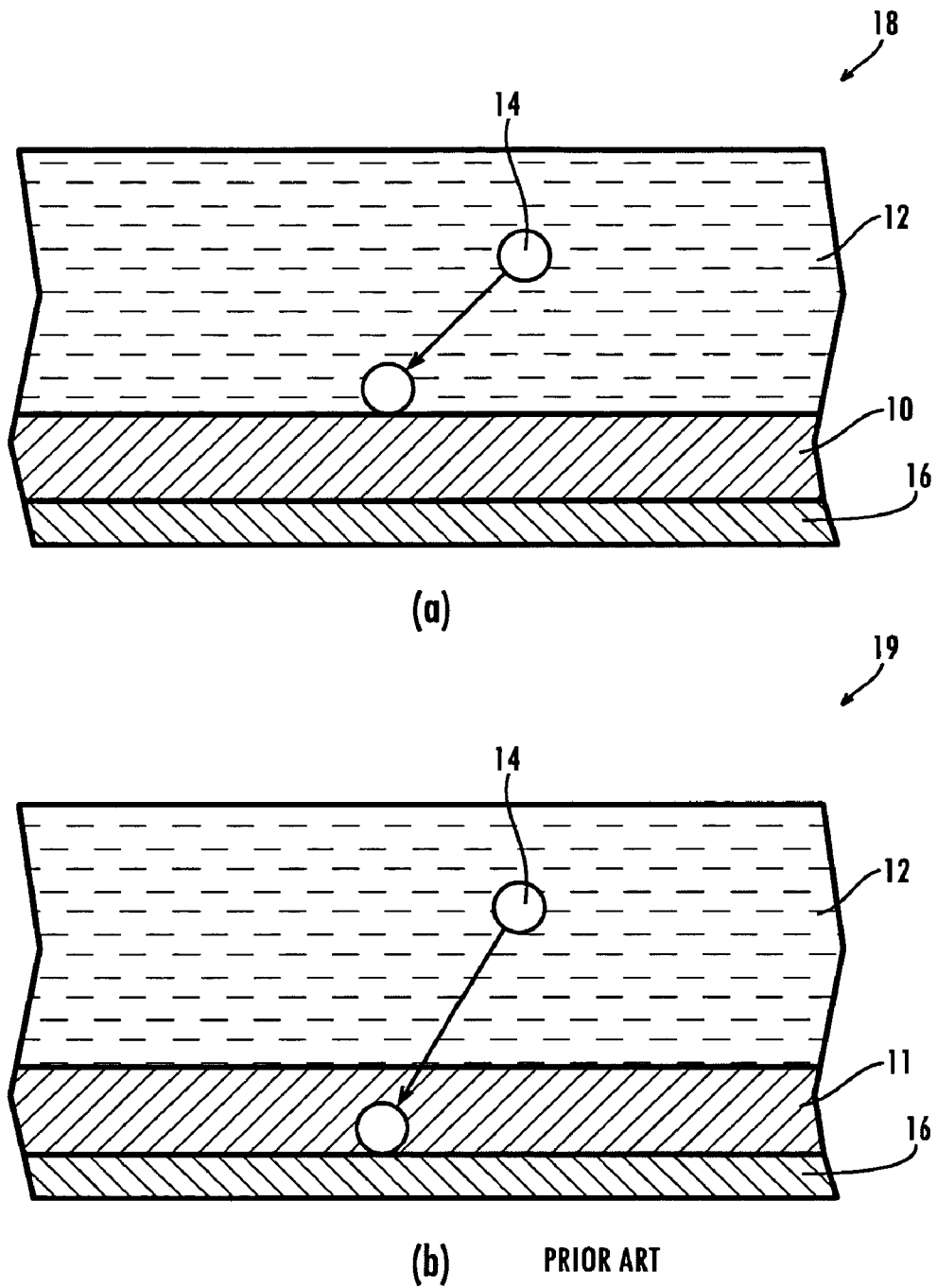
FIG. 1(a) illustrates the dynamic movement of the ion impurity of the liquid crystal materials between the alignment films of the LCD in accordance with one embodiment.
FIG. 1(b) illustrates the dynamic movement of the ion impurity of the liquid crystal materials between the alignment films of the LCD in accordance with the prior art.

FIG. 1 (a) illustrates the dynamic movement of the ionic impurity of the liquid crystal materials between the alignment films of the LCD in accordance with one embodiment. FIG. 1 (b) illustrates the dynamic movement of the ionic impurity of the liquid crystal materials between the alignment films of the LCD in accordance with prior art. Referring to FIG. 1 (a), the alignment film 10 is made of epoxy resin compounds that comprise low molecular thermosetting epoxy resins and derivatives of polyimide and/or polyamic acid. The alignment film 10 can be used to prevent the ionic impurity of the liquid crystal material 12 reaching the pixel electrode 16 of the LCD. The thermosetting epoxy resin compounds have a low average molecular weight and a viscosity of 1 to 3,000 Poise in 25° C.

The derivatives of polyimide and/or polyamic acid can be the common polyimide and/or polyamic acid that includes aromatic compounds having a surface tension about less than 10 dyn/cm.

The epoxy resin compounds used for producing the alignment film comprise derivatives of tetrahydroxyl acid, tetrahydroxyl hydride, tetrahydroxyl dihydride, tetrahydroxyl ester, tetrahydroxyl diester, tetrahydroxyl triester, tetrahydroxyl tetraester, or the polymer synthesized by diamino compounds and the tetrahydroxyl derivatives. For example, the epoxy resin compounds may be the epoxy resin polymers produced by mixing the derivatives of polyimide, reactive catalysts and, organic solvents. The derivatives of polyimide can be used in place of polyamide for increasing the solubility or adjusting the adhesiveness of the epoxy resin compounds. The substitution rate between polyimide and polyamide can be less than 100.

The organic solvents for synthesizing the epoxy resin compounds can be, for example, aprotic polar organic solvents, such as 1-methyl-tetrahydro-pyrrolidinone, 1-acetamino-tetrahydro-pyrrolidinone, N,N-dimethyl-acetamide, N,N-dimethyl-formamide, N,N-diethyl-formamide, pyrimidine, dimethyl-sulfoxide, pyrimidine Ð-tetralactone, tetramethylurea, dimethyl sulfone, hexamethyl-phosphoamide, and N-methyl-Ï-caprolactone, or phenolic solvents, such as m-cresol, xylenol, phenol,and halogenol-phenol. The reactive catalysts may be alkaline, such as triethylamine, pyrimidine, and dimethyl pyrimidine. A cyclodehydration may be conducted during the epoxy resin polymers synthesis. Suitable volume of benzene, toluene, or xylenes may be added to remove the water enforcing the cyclodehydration.

The diamino compounds for synthesizing the epoxy resin compounds may not be specified comprising the derivatives of diamino aromatic compounds, such as structural isomerisms of phenylenediamine with orthro, para, or meta amino group(s), 2,4-diamino-toluene, 1,4-diamino-2-methoxybenzene, 2,5-diamino-dimethylbenzene, 1,3-diamino-4-chlorobenzene, 1,4-diamino-3-chlorobenzene, 1,4-diamino-2,5-dichlorobenzene, 1,4-diamino-2-bromobenzene, 1,3-diamino-4-isopropylbenzene, 1,4-diamino-2-chloro-5-methylbenzene, 5-nitro-m-phenylenediamine, 4,4'-diamino-diphenylmethane, 3,4'-diamino-diphenylmethane, 4,4'-diamino-3,3',55,'-tetramethyl-diphenylmethane, 4,4'-diamino-3,3',55,'-tetraethyl-diphenylmethane, 4,4'-diamino-3,3'-dimethyl-diphenylmethane, 4,4'-diamino-3,3'-diethyl-diphenylmethane, 4,4'-diamino-3,3'-dimethyl-5,5'-diethyl-diphenylmethane, 4,4'-diamino-2,2',3,3'-tetrachloro-diphenylmethane, 4,4'-diamino-3,3'-dichloro-diphenylmethane, 4,4'-diamino-diphenylethane, 4,4'-diamino-diphenyl-2,2-propane, 4,4'-diamino-diphenylether, 3,4'-diamino-diphenylether, 4,4'-diamino-3,3'-dimethyl-diphenylether, 4,4'-3,3'-diethyl-diphenylether, 3,3'-dimethyl-4,4'-diamino-bibenzene, 3,3'-diethyl-4,4'-diamino-bibenzene, 3,3'-5,5'-tetramethyl-4,4'-diamino-bibenzene, 3,3'-5,5'-tetraethyl-4,4'-diamino-bibenzene, 3,3'-dimethyl-4,4'-diamino-bibenzene, 2,2'5,5'-trtachloro-4,4'-diamino-bibenzene, 2,2'-dicholor-4,4'-5,5'-dimethoxy bibenzene, benzidine, 4,4'-diamino-diphenylene sulfide, 4,4'-diamino-diphenylsulfone, 3,3'-diamino-diphenylsulfone, 2,2-bi[4-(4-amino-phenoxy)phenyl]propane, bi[4-(4-amino-phenoxy)phenyl]sulfone, bi(4-[3-amino-phenoxy]phenyl)sulfone, 4,4-bi(4-amino-phenoxy)bibenzene, bi[4-(4-amino-phenoxy)phenyl]ether, 1,4-bi(4-amino-phenoxy)benzene, 1,3-bi(4-amino-phenoxy)benzene, 1,3-bi(3-amino-phenoxy)benzene, 1,4-bi[1-(4-amino-phenyl)-1-methylethyl]benzene, 1,3-bi[1-(4-amino-phenyl)-1-methylethyl]benzene, trimethylenediol-bi(4-aminobenzoate), 1,2-bi(2-amino-phenylthio)ethane, 4,4'-diaminobenzanilide, 9,10-bi(4-amino-phenyl)anthracene, 9,9-bi(1-(4-amino-phenyl)-10-hydroxanthracene, 9,9-bi (4-amino-phenyl)fluorene, o-toluidine, 2,2'-diamino-stilbene, 4,4'-diamino-stilbene, 3,3'-diamino benzophnone, 3,4'-diamino benzophnone, 4,4'-diamino benzophnone, 4,5'-diaminonaphthalene, 3,4'-diaminobenzanilide. The diamino compounds further comprise the diamino compounds with fluorine, such as: 4,4'-diaminophenyl-hexafluoropropane, 3,3'-diamino-pheny-hexafluoropropane, 2,2-bi[4-(4-amino-phenoxy)phenyl]hexafluoropropane, 4,4'-bi[2-(4-amino-phenoxy)phenyl]

hexafluoroisopropyl-biphenylether, 2,2-bi(3-amino-4,5-dimethyl-phenyl)hexafluoropropane, 2,2'-trifluorodimethyl-diamino bibenzene or the derivatives of cyclic or acyclic aliphatic, such as: 4,4'-diamino-cyclohexane, 1,3'-diamino-cyclohexane, 1,4-diamino-methyl-cyclohexane, 1,3-propanediamine, tetramethylene dianine, pentamethylene dianine, hexamethylene dianine, octamethylene dianine, nona methylene dianine, 4,4'-dimethyl-heptamethylene dianine, isophorone dianine, tetrahydroxyl-dicyclopentadiene dianine, hexahydro-4,7-methanoidanylene-dimethyldianine, 3(4),8(9)-bi(amin-ethyl)-tricyclo[5,2,1,0$^{2,6}$]decane. Other compounds such as, dianino-organic silane and siloxane can be used singly, or mixed with the compounds aforementioned for synthesizing the epoxy resin compounds.

The tetrahydroxyl acid derivatives for synthesizing the epoxy resin compounds may can include, for example, anhydride derivatives, dihydride derivatives, mono-alkyl ester derivatives, di-alkyl ester derivatives, tri-alkyl ester derivatives, or tetra-alkyl ester derivatives, of the aromatic tetrahydroxyl acid, for example, 2,3,6,7-naphthalene-tetracarboxylic acids, 1,2,5,6-naphthalene-tetracarboxylic acids, 1,4,5,8-naphthalene-tetracarboxylic acids, 2,3,6,7-naphthalene-tetracarboxylic acids, 1,2,5,6-naphthalene-tetracarboxylic acids, 3,3',4,4'-bibenzene-tetracarboxylic acids, 3,3',4,4'-bibenzene-tetracarboxylic acids, bi(3,4-dicarboxylic-phenyl)ether, 3,3',4,4'-benzophenone-tetracarboxylic acids, bi(3,4-dicarboxylic-phenyl)sulfone, bi(3,4-dicarboxylic-phenyl)methane, 2,2-bi(3,4-dicarboxylic-phenyl)propane, 1,1,1,3,3,3-hexacholr-2,2-bi(3,4-dicarboxylic-phenyl)propane, bi(3,4-dicarboxylic-phenyl)dimethyl-silane, bi(3,4-dicarboxylic-phenyl)diphenyl-silane, 2,3,4,5-pyrimidine-tetracarboxylic acids, 2,6-bi(3,4-dicarboxylic-phenyl)pyrimidine, ethylene glycol-bi(trimellitic acid), 1,3-propylene glycol-bi(trimellitic acid), 1,4-butylene glycol-bi(trimellitic acid), 1,5-pentylene glycol-bi(trimellitic acid), 1,6-hexylene glycol-bi(trimellitic acid), 1,8-heptylene glycol-bi(trimellitic acid), 1,10-octylene glycol-bi(trimellitic acid), 1,16-hexadecylene glycol-bi(trimellitic acid). The tetrahydroxyl acid derivatives further comprise the anhydride derivatives, dihydride derivatives, mono-alkyl ester derivatives, di-alkyl ester derivatives, tri-alkyl ester derivatives, or tetra-alkyl ester derivatives, 1,2,3,4-butane-tetracarboxylic acid, 2,2,6,6-heptane-tetracarboxylic acid, of the aliphatic tetrahydroxyl acid, such as: 5-(2,5-dioxyl-tetrahydro-3-furanyl)-3-methyl-3-cyclo-hxayl-1,2-carboxylic acid, bicyclo[2,2,1]heptane-2,3,4,5,6-tetracarboxylic acid, 1-alkyl-bicyclo[2,2,1]heptane-2,3,5,6-tetracarboxylic acid, 1,2,3,4-cyclo-butane-tetracarboxylic acid, 1,2,3,4-cyclo-pentane-tetracarboxylic acid, 1,2,4,5-cyclo-hexane-tetracarboxylic acid, 2,3,5-tricarboxylic-cyclopentyl-acetic acid, 3,4-dicarboxylic-1,2,3,4-tetrahydro-1-butyl-acetic acid, bicyclo-[2,2,2]-7-octene-2,3,5,6-tetracarboxylic acid, 3,5,6-tricarboxylic-norbornene-2-acetic acid, terahydronaphthalene-1,4,5,8-tetracarboxylic acid, 4,8-dimethyl-1,2,3,5,6,7-hexahydronaphthalene-1,2,5,6-tetracarboxylic acid, 3,3'-bicyclo-hexene-1,1',2,2'-tetracarboxylic acid. The tetrahydroxyl acid derivatives may be used singly, or mixed with the other aforementioned derivatives.

The derivatives of polyimide and/or polyamic acid for synthesizing the epoxy resin compounds to produce the alignment films may have active groups, such as hydroxyl groups, carboxylic groups, isocyanatic groups, ester, vinyl acrylic ester, acid anhydrides, and epoxypropyl groups, on its side chains for retaining the charge holding rate of the disclosed LCD. There are two ways for preparing the derivatives of polyimide and/or polyamic acid with those active groups. First, diamino compounds or/and compounds with teracarboxylic acid having one or two of the aforementioned active groups may be used for generating the derivativesderivatives of polyimide and/or polyamic acid. In the other way, the active groups may be added after the generation of the derivatives of polyimide and/or polyamic acid. The preferred active group may be epoxypropyl groups.

The additional amount of the diamino compounds and the compounds with teracarboxylic acid is dependent on the amount of the derivatives of polyimide and/or polyamic acid generated. In some preferred embodiments, the range of the diamino compounds added may be about 50% to 200% by mole fraction, and the range of mole fraction from about 80% to 120% is more preferable. It must be noted, while the amount of the diamino compounds is added less than about 50% or more than 120% by mole fraction, the molecular weight of the polyimide and/or polyamic acid may be too low to create a film.

The derivatives of polyimide and/or polyamic acid may be generated by the reaction of the diamino compounds, the compounds with tetracarboxylic acid, and organic solvents such as, n-methyl-2-dihydro-pyrrolidinone, dimethyl-acetamide, dimethyl-formamide, dimethyl-sulfone, tetrahydrophene-1,1-dioxide, tetralactone, methyl phenol, phenol, cyclo-hexane, dioxane, tetrahydro-pyranyl, butyl-cellosolve, butyl-cellosolve-acetate, acetophenone. The reactive temperatures may be in the range of −20° C. to 200° C.

The low molecular thermosetting epoxy resins for synthesizing the epoxy resin compounds of the alignment films in accordance with present invention may have a viscosity ranged from about 1 poise to 3,000 poise in 25° C. The rage from about 10 poise to 1,000 poise in 25° C. is preferable, and from about 10 poise to 500 poise is more preferred. The most preferred range may be from about 10 poise to 45 poise in 25° C. The thermosetting epoxy resins with the preferable viscosity can activate with the derivatives of polyimide and/or polyamic acid well for achieving the desired disclosed objects.

The low molecular epoxy resin compounds of the alignment films can result from cross-linking between the thermosetting epoxy resins and the derivatives of polyimide and/or polyamic acid. The thermosetting epoxy resin is high density and includes active groups, such as hydroxyl groups, carboxylic groups, isocyanatic groups, ester, vinyl acrylic ester, acid anhydrides, or glycidyl or epoxy groups. From the standpoint of treating characteristics, adheredness, or decreased side effects when co-working with the other apparatus, the epoxy resin compounds with one or two glycidyl groups may be more preferred.

The molecular weight of the thermosetting epoxy resins may be in range of about 150 to 5,000, wherein the molecular weight less than about 2,000 is more preferable, and the most preferred molecular weight is less than about 1,000. The thermosetting epoxy resins with the molecular weight larger than about 5,000 may be too viscous to be used for fabricating the alignment films. The high viscosity may restrict the reaction between the thermosetting epoxy resins and the derivatives of polyimide and/or polyamic acid.

According to one embodiment, a thermosetting epoxy resin unit having one or two epoxypropyl groups is provided, for example, the diepoxypropyl-ether such as, bisphenol F, bisphenol A, bisphenol S, dihydroxynaphthalene phenol, bicyclo-heptadiene-diphenol, bicyclo-heptadiene-, epoxy-phenol-varnish, epoxy-phenolformaldehyde-varnish, epoxy-trihydroxyphenyl-methane, epoxy-tetrahydroxyphenyl-methane, epoxy methoxylene-diamine, and cyclo-aliphatic resins.

A good "compatibility" of liquid crystal molecules means having good electrical characteristics without creating stress. With this point of view, the thermosetting epoxy resin having at least one cyclic aromatic component may be preferable. The chemical formula of an exemplary compound is illustrated as: (wherein the n is an integer greater than 1)

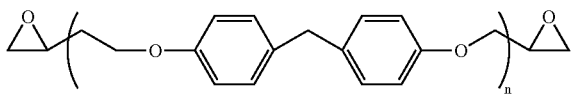

Bisphenol F is a polymer with long chain having epoxypropyl groups on the end of the chain structure. The polymer can react with derivatives of polyimide and/or polyamic acid by thermal treatment. As n=1, the molecular weight and a molecular structure of bisphenol F are similar to the liquid crystal material 12 of the LCD modules. In addition, the bisphenol F can dissolve in the organic solvent easily, and react with derivatives of polyimide and/or polyamic acid well, due to its low viscosity.

The mixing ratio of the low molecular thermosetting epoxy resins to the derivatives of polyimide and/or polyamic acid may be ranged from about 0.1:99.9 to 95:5, wherein the preferred range is about 0.1:99.9 to 80:20, the range of about 0.1:99.9 to 65:35 is more preferred. The most preferred range is about 0.1:99.9 to 15:85.

Although the epoxy resin compounds can still reach high charge holding rate, the performance of the liquid crystal materials of a lcd may be affected. When the mixing ratio of the thermosetting epoxy resins to the derivatives of polyimide and/or polyamic acid is greater than about 95:5 by weight, the portion of low molecular weight thermal setting resin is larger.

Organic solvents may be used for dissolving the derivatives of polyimide and/or polyamic acid and the thermosetting epoxy resins to produce the epoxy resin compounds of the alignment films. For example, the organic solvents, such as alcohols, ketones, ethers, esters, halogenated, hydrocarboxylic compounds, carboxyl compounds, and the compounds used for generating the derivatives of polyimide and/or polyamic acid may be considered. And the selection of the organic solvents may depend on the molecular weight of the thermosetting epoxy resins.

The sequence of adding the organic solvents, the thermosetting epoxy resins, and the derivatives of polyimide and/or polyamic acid is not specified. For example, the derivatives of polyimide and/or polyamic acid can be added in the organic solvents before or after the thermosetting epoxy resins were added. In other embodiments, the organic solvents may be added after the derivatives of polyimide and/or polyamic acid and the thermosetting epoxy resins were mixed. In addition, some hardener agents, such as amines, amine esters, polythiols, polyphenols, polyisocyanates, hydroxyl hydrides, hydroxyl acids, or organic alkoxide silane may be utilized during the processes of producing the epoxy resin compounds.

After the preparation of the epoxy resin compounds, a known process for spreading the epoxy resin compounds onto the substrate can be conducted to form an alignment film. The following description is the detailed processes for producing an alignment film:

(1) A substrate of a LCD 18 having predetermined circuits or pixel electrodes 16 can be prepared.

(2) The epoxy resin compounds comprising the derivatives of polyimide and/or polyamic acid and thermosetting epoxy resins can be prepared. Wherein the mixing ratio of the derivatives polyimide and/or polyamic acid of to the thermosetting epoxy resins can range from about 99.9:0.1 to 5:95 by weight.

(3) A spreading method of prior art, such as spin coating, printing, brush spreading, or spraying can be utilized to spread the epoxy resin compounds onto the substrate.

(4) The organic solvents used for dissolving the derivatives of polyimide and/or polyamic acid and the thermosetting epoxy resins, can be removed by evaporation. Then, the substrate spread with the epoxy resin compounds can be baked within a high-temperature ambiance. Wherein, the ambiance of evaporation can be chosen independent of the selection of the organic solvents. The baking temperature can be chosen independent of the selection of the derivatives of polyimide and/or polyamic acid and the thermosetting epoxy resins.

(5) The epoxy resin compounds on the substrate can be rubbed after the baking processes to form an alignment film.

The following steps can form the LCD 18:

(1) The glass substrates having the aforementioned alignment films can be rubbed before adhesive and spacers are spread on its surface. Then, a thermal taping process can be conducted. (2) Then, the liquid crystal materials 12 can be filled. (3) A UV sealing agent can be used for the sealing portion in the sealing processes. An annealing process can adhere the polarizing films.

The disclosed alignment film can be produced without changing the manufacturing facilities. The only exception can be the use of the low molecular thermosetting epoxy resins. Thus, the alignment film disclosed herein can provide better performance economically. For example, the alignment film disclosed herein can retain the charge holding rate of the LCD greater than 95%, even greater than 97%, for 2,000 hours within atmosphere of high humidity and high temperature. Accordingly, the response time of the LCD can be decreased by the disclosed films, such that the interference of impurity ions is eliminated.

Referring to FIG. 1(*a*) and FIG. 1(*b*), in accordance with understandings from tests conducted over a long period of time, the deviations for liquid crystal 12 between the use of alignment films 10 and 11 may lead to the improved performance and results achieved by the embodiments of the present disclosure.

In FIG. 1(*b*), shown is a LCD made of the alignment film 11 and the liquid crystal material 12 according to the prior art. The molecular structure of the alignment film 11 can be sponge-like. The liquid crystal material 12 can be filled in the holes in the sponge-like structure. The impurity 14 can flow through the liquid crystal material 12 filled in the sponge-like structure, reaching to the pixel electrode 16. The movement of the impurity 14 that can consume the charge accumulated on the pixel electrode 16 is considered to be the reason of the degradation of the charge holding rate.

The detail mechanism is described as follows:

(a) The long and thin molecular structure and the molecular weight of the thermosetting epoxy resins are similar to the structure and the molecular weight of the liquid crystal material 12. Therefore, the thermosetting epoxy resins can be compatible with the solvents that include polyimide as well, and dissolve in the derivatives of polyimide easily. In addition, the derivatives of polyimide and/or polyamic acid can be used as the initiator by heating. The reactive groups of the thermosetting epoxy resins can react with the carboxylic groups of the derivatives of polyimide and/or polyamic acid by heating.

(b) The structure of the alignment film 11 of the prior art made of polyimide can be sponge-like. The liquid crystal materials 12 can be filled in the sponge-like structure. Referring to FIG. (*b*), the impurity 14 can flow through the liquid crystal material 12 filled in the holes of the sponge-like structure reaching to the pixel electrode 16. The ratio of voltage decreasing around the pixel electrode 16 could be greater than the ratio of voltage decreasing around the liquid crystal material 12 due to the movement of the impurity 14.

(c) Cross-linking can be formed between the thermosetting epoxy resins and the derivatives of polyimide and/or polyamic acid. Referring to FIG. 1(a), the cross-linked structure is considered to be a barrier that blocks the movement of the impurity ions existing in the alignment. The holes of the sponge-like structure can be blocked by the cross-linking, such that can prevent the charge holding rate of the LCD is prevented, due to the blockage of movement of the impurity 14.

As is understood by a person skilled in the art, the foregoing preferred embodiments are illustrative rather than limiting, of the present disclosure. It is intended to cover various modifications and similar arrangements included within the spirit and scope of the appended claims, the scope of which should be accorded the broadest interpretation so as to encompass all such modifications and similar structure.

There following two examples of an LCD will illustrate the manufacturing processes and the advantages of disclosed films and LCD materials:

EXAMPLE 1

Two duplicates of a sample are prepared. Epoxy resin compounds consisting of bisphenol F epoxy ester (JAPAN EPOXY RESINES Co., LTD. Ebicoat806) and polyimide ester wax (NISSAN CHEMICAL INDUSTRIES LTD., SE7492$^{TD}$ 6% of the solid) are prepared in varying concentrations of having 0%, 1%, 10%, 50% bisphenol F epoxy ester by weight. Then the epoxy resin compounds of varying concentrations are spin spread onto the glass substrates having ITO (indium-tin-oxide) transparent electrodes respectively. After a pre-bake process with in an 85° C. ambient temperature, a thermal harden process is performed on the substrates with the epoxy resin compounds in 220° C. for 30 minutes to form films of thickness within about 60nm to 100 nm. Consequently, a rubbing process with the scribing depth of 0.3 mm, 700 mm, 1,000 mm/min is conducted. An epoxy thermosetting sealing agent can be printed on the substrates over the epoxy compounds before the spacers of 5.25 μm were spread onto them. Then, the glass substrates are tapped respectively. After the liquid crystal material with fluorine provided by MERK, LTD.$^{TD}$ (NO.ZLI4792+5.3 dielectric anisotropy) is filled, a UV-setting sealing agent can be used for the sealing processes to produce a LCD 18 with single pixel.

Figure 2:
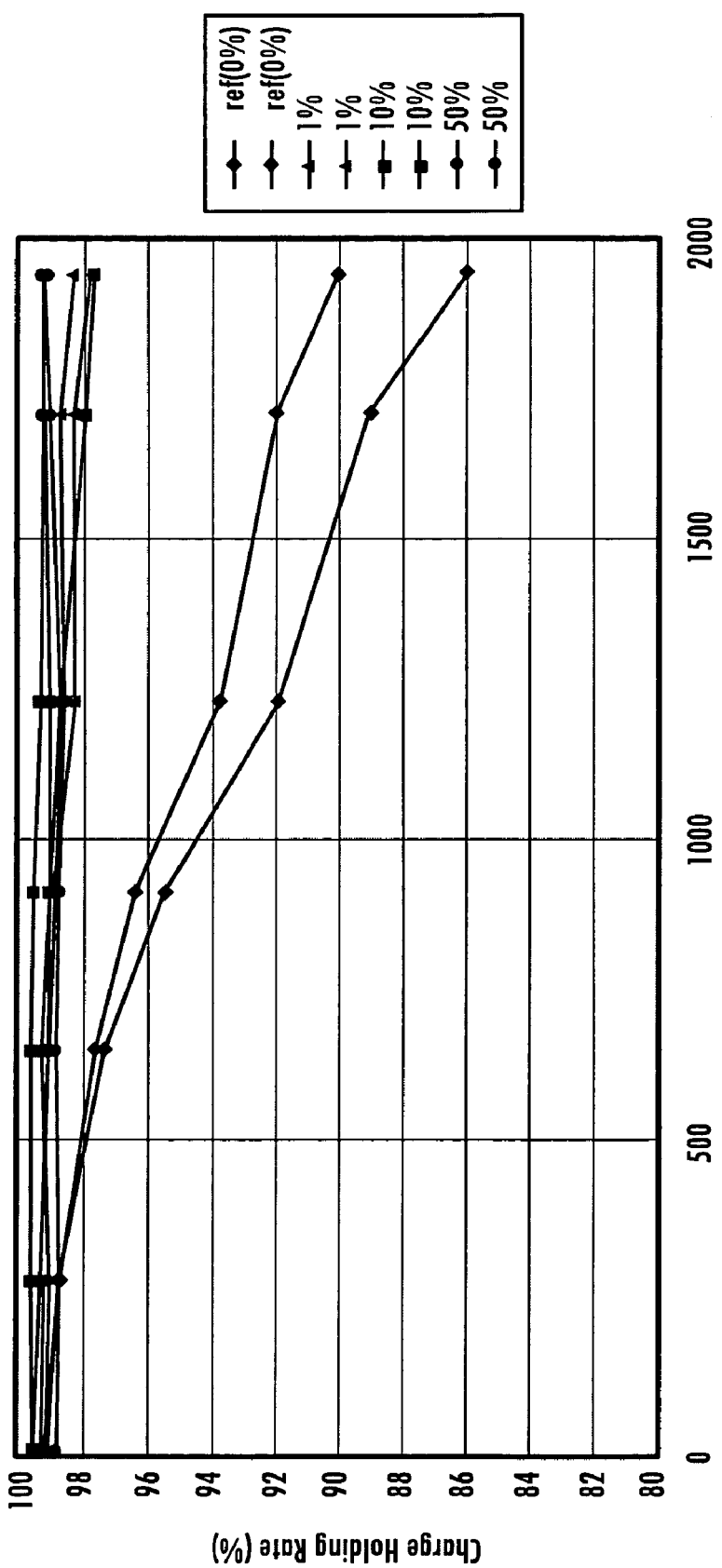
FIG. 2 illustrates the curve of the charge holding rate measured by the reliability test conducted on liquid crystal materials with fluorine.

A reliability test is conducted on the LCD 18 for a long time to determine the charge holding rate of the liquid crystal material 12. The reliability test is proceeded within environment of 80% relative humidity, 70° C. for 2,000 hours. Some measurements were taken from the LCD 18 during the test to determine the variation of the charge holding rates. The measurements conducted with the testing voltage of 5 V by a measuring machine (TOYO TEKUNIKU COPORATION), which read the measurements every 500 micro-second. The results of the reliability test are described on Table 1 and FIG. 2. Table 1 illustrates the charge holding rates of the liquid crystal material (NO.NLI4792), measured by the reliability test. FIG. 2 illustrates the curve of the charge holding rate measured by the reliability test conducted on the liquid crystal materials with various concentrations.

TABLE 1

| The ratio of Bisphenol F Epoxy ester within the Epoxy Resin compounds | Time(hours) | | | | | | |
|---|---|---|---|---|---|---|---|
| | 0(h) | 284(h) | 661(h) | 921(h) | 1237(h) | 1713(h) | 1944(h) |
| 0 wt % | 99.23 | 98.72 | 97.62 | 96.39 | 93.81 | 92.12 | 90.12 |
| 0 wt % | 99.11 | 98.72 | 97.39 | 95.5 | 92.02 | 89.12 | 86.09 |
| 1 wt % | 99.53 | 99.29 | 99.12 | 98.94 | 98.55 | 98.74 | 98.37 |
| 1 wt % | 99.54 | 99.29 | 99.09 | 98.85 | 98.27 | 98.32 | 97.8 |
| 10 wt % | 99.59 | 99.6 | 99.6 | 99.51 | 99.36 | 99.15 | 99.26 |
| 10 wt % | 99.37 | 99.21 | 99.28 | 99.09 | 98.71 | 97.93 | 97.68 |
| 50 wt % | 98.83 | 98.74 | 98.87 | 98.77 | 98.74 | 99.03 | 99.17 |
| 50 wt % | 99.1 | 99.04 | 99.15 | 99.01 | 99.03 | 99.25 | 99.34 |

According to the results described on Table 1, the degradation of charge holding rate can not occur on the LCD 18, after the test is conducted for 2,000 hours.

EXAMPLE 2

Figure 3:
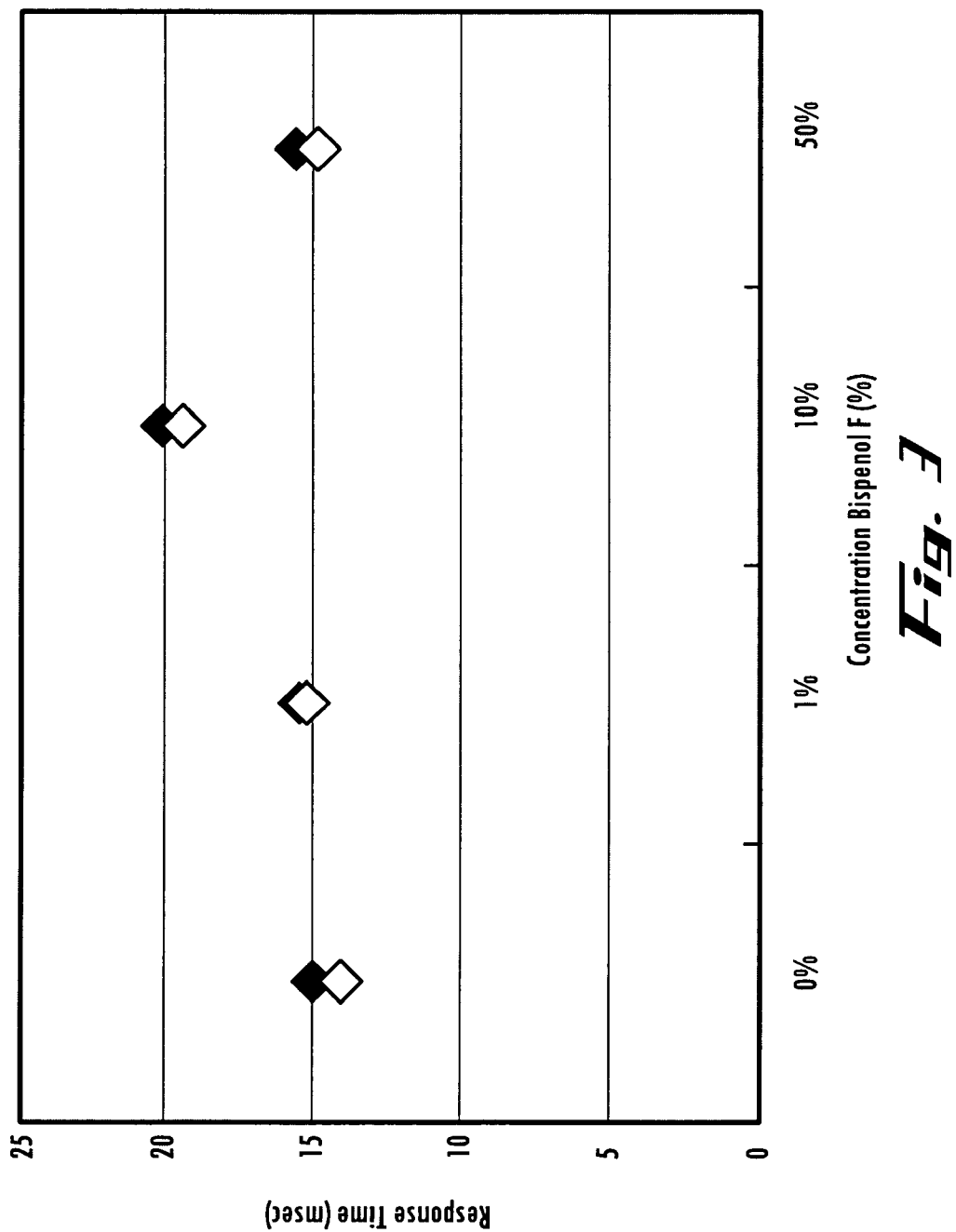
FIG. 3 illustrates the curve of the response time of the alignment films with various concentrations of bisphenol F epoxy resin obtained from the disclosed response test.

LCDs similar to the Example 1 are prepared, wherein the liquid crystal material with fluorine provided by Merck INDUSTRIES, LTD.$^{TD}$ (NO.ZLI4792+5.3 dieletric anisotropy) is selected for the LCD 18. Two duplicates of sample are prepared. Epoxy resin compounds consisting of bisphenol F epoxy ester (JAPAN EPOXY RESINES Co., LTD.) and polyimide ester wax (NISSAN CHEMICAL INDUSTRIES, LTD.$^{TD}$ SE7492 6%) are also prepared in varying concentrations of 0%, 1%, 10%, 50% epoxy resin by weight respectively. A response test is conducted on the LCD 18 to determine the response time (ON+OFF) of the LCD 18. The results of the test are described on Table 2 and FIG. 3. Table 2 illustrates that the response time of the alignment films that made of the epoxy resin compounds of various concentrations having 0%, 1%, 10%, 50% bisphenol F epoxy ester by weight. The results of the test determine that the alignment films disclosed herein can generally perform in a stable situation. FIG. 3 illustrates the curve of the response time obtained from the alignment films having various concentrations of bisphenol F according to the response test.

TABLE 2

| The Concentrations of Bisphenol F Epoxy ester with in the Epoxy Resin compounds | Response time (msec) |
|---|---|
| 0% | 15.1 |
| 0% | 14.2 |
| 1% | 15.5 |
| 1% | 15.3 |
| 10% | 20.1 |
| 10% | 19.4 |
| 50% | 14.8 |
| 50% | 15.6 |

Figure 4:
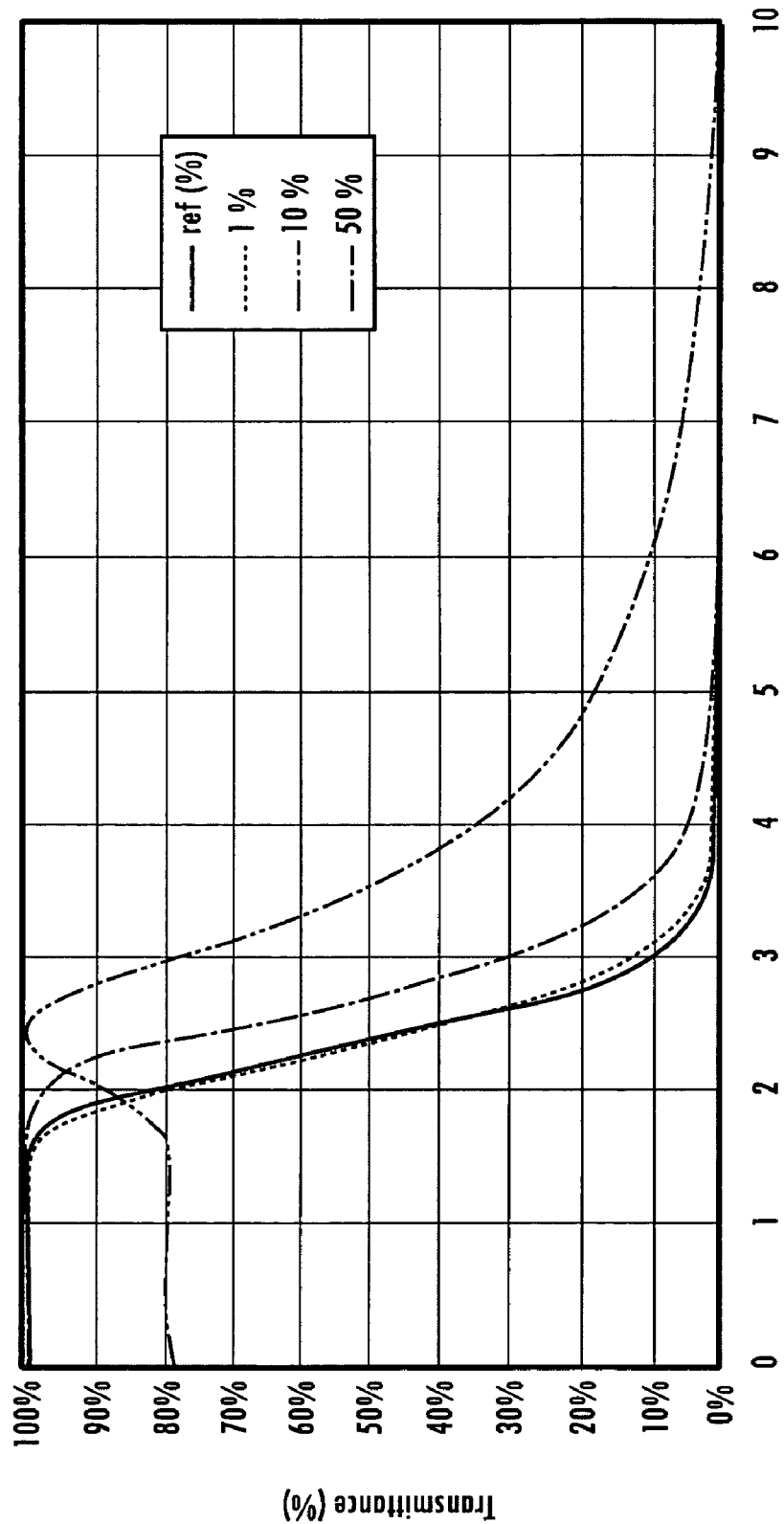
FIG. 4 illustrates the curve of the voltage—Transmittance ratio of the liquid crystal materials varying with the concentrations of bisphenol F epoxy resin.

Another test can be conducted to the LCD 18 made of the alignment films provided by the Example 2 for determining a Voltage-Transmittance ratio measured by a luminance meter (produced by INTERNATIONAL DISPLAY TECHNOLOGY Co., LTD.). The results are described on FIG. 4.

Referring to FIG. (1a) and FIG. (1b), the LCD 18 produced by the epoxy resin compounds of the concentration 1% by weight can work as the LCD 19 of prior art. While the concentration of the epoxy resin compounds is increased, it is necessary to increase the working voltage for the same performance of the liquid crystal materials 12. Thus, the epoxy resin compounds of low concentrations may be used. It is more preferable to retain the concentration of the epoxy resin compounds about 10%, as if the power consumption is not the major concerns. However, as appreciated, the performance deviation of the liquid crystal materials 12 can occur as the concentration of the epoxy resin compounds increased to about 50%.

Accordingly, the liquid crystal materials 12 with the epoxy resin compounds of the concentration 1% by weight can prevent the degradation of the charge holding rate well. And the technological advantage of present invention can be approved by the serious tests described in example 1 and example 2.

Disclosed herein is an alignment film 10 that includes epoxy resin compounds to improve the reliability and the charge holding rate of a LCD 18, wherein the epoxy resin compounds can be produce by mixing thermosetting epoxy resins and derivatives of polyimide and/or polyamic acid. The average molecular weight of the thermosetting epoxy resins can be less about 5,000 with a viscosity of 1 poise to 3,000 poise in 25° C., for example when the epoxy resins having two aromatic components.

A reliability test may be conducted to present alignment films with in a high temperature and high humidity ambiance. The charge holding rate may be retained greater than 95% or even greater than 97% for 2,000 hours within the atmosphere of high humidity and high temperature.

The low molecular thermosetting epoxy resin compounds disclosed herein can be used to prevent the degradation of the charge holding rate due the impurity in the liquid crystal materials. Thus, the low molecular thermosetting epoxy resin compounds can be used for fabricating a low power-consumption LCD 18, even if the liquid crystal materials having high dielectric anisotropy might be used.

What is claim is:

1. An alignment film for fabricating a liquid crystal display (LCD), of the film comprising an epoxy resin compound comprising a low molecular thermosetting epoxy resin and a derivative of polyimide and/or polyamic acid, wherein the thermosetting epoxy resin has a viscosity ranging from about 1 to 3,000 poise in 25° C.

2. The alignment film according to claim 1, wherein at least one of the low molecular thermosetting epoxy resin and br the derivative of polyimide and/or polyamic acid has active groups selected from a group consisting of hydroxyl group, carboxylic group, isocyanatic group, active ester, vinyl acrylic ester, acid anhydride, and epoxypropyl group.

3. The alignment film according to claim 1, wherein the low molecular thermosetting epoxy resin has an average molecular weight ranging from about 150 to 5,000.

4. The alignment film according to claim 3, wherein the low molecular thermosetting epoxy resin has at least one aromatic ring.

5. The alignment film according to claim 1, wherein the epoxy resin compound is produced by mixing the low molecular thermosetting epoxy resin and the derivative of polyimide and/or polyamic acid with a ratio ranging from about 0.1:99.9 to 95:5.

6. The alignment film according to claim 5, wherein the epoxy resin compound is produced by mixing the low molecular thermosetting epoxy resin and the derivative of polyimide and/or polyamic acid with a ratio ranging from about 0.1:99.9 to 80:20.

7. A liquid crystal display, comprising:

an array substrate;

a color filter located on the opposite side of the array substrate; and a liquid crystal material, retained between the array substrate and the filter, wherein the array substrate and the color filter further comprise an alignment film, of the film comprising an epoxy resin compound comprising a low molecular thermosetting epoxy resin and a derivative of polyimide and/or polyamic acid, wherein the thermosetting epoxy resin has a viscosity ranging from about 1 to 3,000 poise in 25° C.

8. The liquid crystal display according to claim 7, wherein at least one of the low molecular thermosetting epoxy resin and br the derivative of polyimide and/or polyamic acid has active groups selected from a group consisting of hydroxyl group, carboxylic group, isocyanatic group, active ester, vinyl acrylic ester, acid anhydride, and epoxypropyl group.

9. The liquid crystal display according to claim 7, wherein the low molecular thermosetting epoxy resin has an average molecular weight ranging from about 150 to 5,000.

10. The liquid crystal display according to claim 9, wherein the low molecular thermosetting epoxy resin has at least one aromatic ring.

11. The liquid crystal display according to claim 7, wherein the epoxy resin compound is produced by mixing the low molecular thermosetting epoxy resin and the derivative of polyimide and/or polyamic acid with a ratio ranging from about 0.1:99.9 to 95:5.

12. The liquid crystal display according to claim 11, wherein the epoxy resin compound is produced by mixing the low molecular thermosetting epoxy resin and the derivative of polyimide and/or polyamic acid with a ratio ranging from about 0.1:99.9 to 80:20.

* * * * *